US008677563B2

(12) United States Patent
Diep et al.

(10) Patent No.: US 8,677,563 B2
(45) Date of Patent: Mar. 25, 2014

(54) TRUNK CUSHION

(75) Inventors: Tien T. Diep, West Bloomfield, MI (US); Terri L. Wernert, China, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/536,195

(22) Filed: Jun. 28, 2012

(65) Prior Publication Data

US 2014/0000066 A1 Jan. 2, 2014

(51) Int. Cl.

| | |
|---|---|
| ***F16F 1/36*** | (2006.01) |
| ***F16F 1/373*** | (2006.01) |
| ***E05F 5/00*** | (2006.01) |

(52) U.S. Cl.
USPC ................. 16/82; 16/86 A; 16/86 R; 267/140

(58) Field of Classification Search
USPC ........... 16/82, 85, 86 R, 86 A; 296/35.1, 207; 267/139, 140, 152, 153
See application file for complete search history.

(56) References Cited

U.S. PATENT DOCUMENTS

| | | | | |
|---|---|---|---|---|
| 278,007 | A | 5/1883 | Garsed | |
| 283,658 | A | 8/1883 | Porter | |
| 380,309 | A | 4/1888 | Berliner | |
| 1,563,876 | A | 12/1925 | Smith | |
| 1,915,249 | A * | 6/1933 | Jorgensen | 248/345.1 |
| 1,923,933 | A * | 8/1933 | Kartzmark | 292/70 |
| 1,946,954 | A * | 2/1934 | Ventura | 292/17 |
| 1,978,249 | A * | 10/1934 | Decarie | 16/86 A |
| 2,015,622 | A | 9/1935 | Evulich | |
| 2,813,712 | A * | 11/1957 | Stanis | 267/257 |
| 2,817,510 | A * | 12/1957 | Hoban | 267/292 |
| 3,042,958 | A | 7/1962 | Spears | |
| 3,193,237 | A * | 7/1965 | Adams | 267/141.4 |
| 3,459,395 | A | 8/1969 | Scotto | |
| 3,643,755 | A * | 2/1972 | Gionet et al. | 180/69.21 |
| 3,806,106 | A * | 4/1974 | Hamel et al. | 267/152 |
| 4,050,726 | A * | 9/1977 | Hablitzel | 293/122 |
| 4,103,951 | A * | 8/1978 | Bank et al. | 293/110 |
| 4,181,339 | A * | 1/1980 | Rigsby | 292/347 |
| 5,158,322 | A * | 10/1992 | Sun | 280/732 |
| 5,584,099 | A | 12/1996 | Westerdale | |
| 6,502,883 | B2 * | 1/2003 | Rice | 296/35.1 |

(Continued)

FOREIGN PATENT DOCUMENTS

| | | | |
|---|---|---|---|
| DE | 3610828 | A1 | 10/1987 |
| EP | GB 9226681 | | 2/1993 |

(Continued)

*Primary Examiner* — Victor Batson
*Assistant Examiner* — Jason W San
(74) *Attorney, Agent, or Firm* — Harness, Dickey & Pierce, P.L.C.

(57) ABSTRACT

A cushion member includes a resilient material body having multiple different diameters defining a body bell-shape. The body includes a solid first portion having a first diameter. An aperture extends through the first portion transverse to a body longitudinal axis. A hollow second portion defines a hollow chamber in communication with the aperture. The second portion has a second diameter larger than the first portion first diameter. A third portion has a third diameter smaller than the second diameter. An end flange is connected to the third portion. The differing first, second, and third diameters induce the body to elastically compress when a force is applied to the end flange and to return to an uncompressed state after force dissipation. A flow rate of air forced out of the hollow chamber during second and third portion compression and out the aperture is restricted by an aperture diameter.

13 Claims, 5 Drawing Sheets

(56) References Cited

U.S. PATENT DOCUMENTS

| | | | | |
|---|---|---|---|---|
| 6,533,258 | B2 * | 3/2003 | Monson et al. | 267/153 |
| 6,588,820 | B2 * | 7/2003 | Rice | 296/35.1 |
| 6,857,166 | B2 * | 2/2005 | Nakagaki et al. | 16/86 R |
| 7,384,226 | B2 * | 6/2008 | Jones et al. | 411/508 |
| 7,810,598 | B2 * | 10/2010 | Nonogaki | 180/69.22 |
| 8,291,547 | B2 * | 10/2012 | Ukai et al. | 16/86 R |
| 8,382,078 | B2 * | 2/2013 | Okada et al. | 267/140 |
| 2005/0230891 | A1 * | 10/2005 | Griffin | 267/292 |
| 2006/0001205 | A1 * | 1/2006 | Raza | 267/152 |
| 2006/0208406 | A2 * | 9/2006 | Al-Dahhan et al. | 267/220 |
| 2009/0102218 | A1 * | 4/2009 | Fernandez et al. | 296/35.1 |
| 2010/0025903 | A1 * | 2/2010 | Thye-Moormann | 267/153 |
| 2010/0117276 | A1 * | 5/2010 | Okada et al. | 267/139 |
| 2010/0192335 | A1 * | 8/2010 | Ukai et al. | 24/591.1 |
| 2011/0030177 | A1 * | 2/2011 | Ukai et al. | 24/458 |
| 2011/0079943 | A1 * | 4/2011 | Wolf et al. | 267/141 |
| 2011/0187035 | A1 * | 8/2011 | Cagle et al. | 267/153 |
| 2011/0210491 | A1 * | 9/2011 | Tavares et al. | 267/153 |

FOREIGN PATENT DOCUMENTS

| | | | |
|---|---|---|---|
| EP | 0801200 | A2 | 10/1997 |
| FR | 2703395 | A1 | 10/1994 |
| JP | 8270701 | A | 10/1996 |
| JP | 8326819 | A | 12/1996 |
| JP | 11020742 | A | 1/1999 |
| JP | 2010112542 | A | 5/2010 |

* cited by examiner

TRUNK CUSHION

FIELD

The present disclosure relates to resilient material dampers or cushions used to absorb component impact forces from automobile vehicle trunk lid or door opening/closing operations.

BACKGROUND

This section provides background information related to the present disclosure which is not necessarily prior art.

Automobile trunk lids are normally manually opened with the assistance of a mechanism including opposed trunk arms that are connected between the trunk lid and panel or structure of the vehicle body. Trunk lids may have their motion assisted to reduce the lifting force required by the operator and/or may contact rubber or resilient material bumpers at the end of arm travel to stop trunk lid travel. At present, if a vehicle trunk lid is opened too quickly, and particularly when newer design reduced resistance trunk lid mechanisms are used, the lid will rebound or bounce off away from the rubber stops used to absorb and dampen this travel, and can either block access to the trunk, requiring a second opening action, or strike the operator.

SUMMARY

This section provides a general summary of the disclosure, and is not a comprehensive disclosure of its full scope or all of its features.

According to several aspects, a cushion member includes a resilient material body having multiple different diameters defining a bell-shape. The body includes a substantially solid first portion having a first diameter coaxially aligned with a body longitudinal axis. A through-aperture extends through the first portion and is oriented perpendicular to the body longitudinal axis. A substantially hollow second portion defining a hollow chamber is in communication with the through-aperture. The second portion has a second diameter which is larger than the first diameter of the first portion. A flange is oppositely positioned with respect the first portion. The differing first and second diameters of the body induce the body to longitudinally compress when a force is applied to the flange and to return to an uncompressed state after the force is dissipated.

According to further aspects, a cushion member includes a resilient material body having multiple different diameters defining a body bell-shape. The body includes a substantially solid first portion having a first diameter. A through-aperture extends through the first portion transverse to a longitudinal axis of the body. A hollow second portion defining a hollow chamber is in communication with the through-aperture, the second portion having a second diameter which is larger than the first diameter of the first portion. A third portion has a third diameter smaller than the second diameter. An end flange is connected to the third portion. The differing first, second, and third diameters of the body induce the body to elastically compress when a force is applied to the end flange and to return to an uncompressed state after the force is dissipated. A flow rate of air from the hollow chamber forced out of the hollow chamber during compression of the second and third portions and out the through-aperture is restricted by a diameter of the through-aperture.

According to still further aspects, a cushion member includes a resilient material body having multiple different diameters defining a body bell-shape. The body includes a substantially solid first portion having a minimum first diameter. A conical shaped connector is integrally connected to the first portion and extends from a planar shoulder end of the first portion. A through-aperture extends through the first portion and is oriented transverse to a longitudinal axis of the body such that no portion of the through-aperture extends into or through the connector. A substantially hollow second portion defining a hollow chamber is in communication with the through-aperture, the second portion having a second diameter which is larger than the first diameter of the first portion. A third portion integrally connected to the second portion has a third diameter smaller than the second diameter. An end flange is connected to the third portion. The first and third diameters, being smaller than the second diameter, induce the body to elastically and longitudinally compress when a force is applied to the end flange, thereby discharging air in the hollow chamber out through the through-aperture and to return to an uncompressed state after the force is dissipated.

According to further aspects, a vehicle component energy dampening system includes a cushion member connected to a body panel of the vehicle. The cushion member includes a resilient material body having multiple different diameters defining a bell-shape. The body includes: a substantially solid first portion having a first diameter coaxially aligned with a body longitudinal axis; a through-aperture extending through the first portion and oriented perpendicular to the body longitudinal axis; a substantially hollow second portion defining a hollow chamber in communication with the through-aperture, the second portion having a second diameter which is larger than the first diameter of the first portion; and a flange oppositely positioned with respect to the first portion, the differing first and second diameters of the body inducing the body to longitudinally compress when a force is applied to the flange and to return to an uncompressed state after the force is dissipated. A vehicle component is movable with respect to the vehicle body panel such that the vehicle component contacts the cushion member to impart the force.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
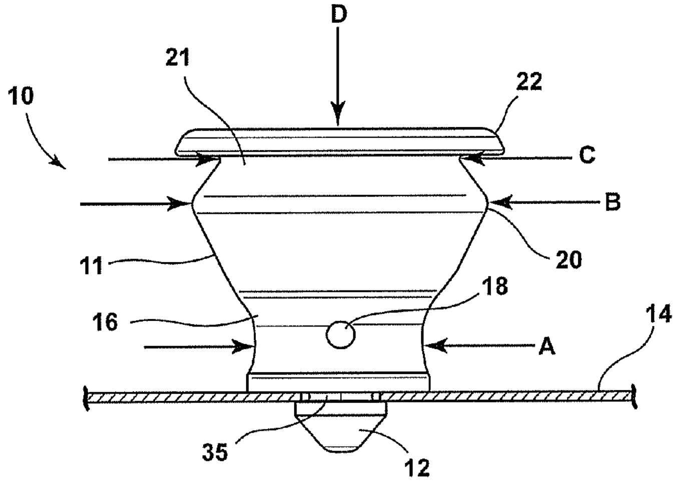
FIG. 1 is a partial cross sectional front elevational view of a trunk cushion of the present disclosure shown in an installed, non-compressed position with respect to a vehicle body panel.

Referring to FIG. 1, a cushion member 10, which according to several aspects defines a trunk cushion, includes a multiple diameter or bell-shaped body 11 made for example from a resilient material such as EPDM (ethylene propylene diene monomer) having a predetermined Shore A durometer that can range between approximately 25 to 80. Although cushion member 10 is described in reference to use for a vehicle trunk cushion, cushion members 10 of the present disclosure can be used in any application where similar dampening characteristics are required. A connector 12 extending from a first end of body 11 is initially compressed to be received in an aperture of a body panel 14 and then expands to its original size to thereafter act to resist removal of body 11 from body panel 14. Body 11 further includes a body first portion 16 positioned proximate to connector 12 which is substantially solid and has a minimum first diameter "A". A through-aperture 18 extends through first portion 16. Body 11 further includes a body second portion 20 connected to first portion 16, which is substantially hollow, and has a maximum second diameter "B" which is larger than first diameter "A" of first portion 16. A body third portion 21 connected to second portion 20 has a diameter "C" less than, equal to, or greater than first diameter "A", but is smaller than diameter "B" of second portion 20 to thereby induce body 11 to elastically longitudinally compress when a load or force "D" is applied to an end flange 22 of body 11 and then to subsequently rebound to a non-compressed state (shown in FIG. 1) after the force is absorbed and/or is dissipated by compression and expansion of body 11.

Figure 2:
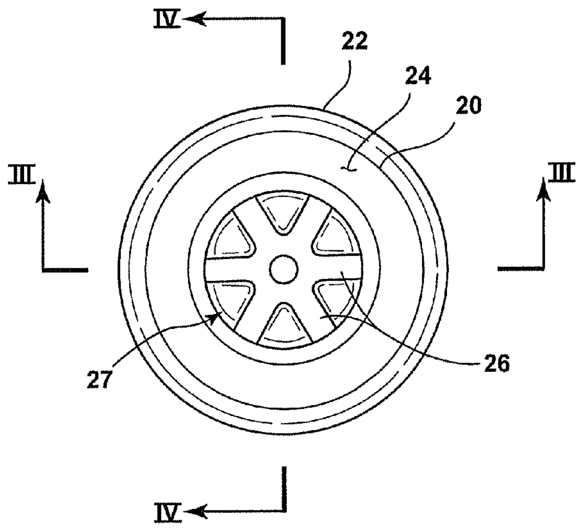
FIG. 2 is a top plan view of the trunk cushion of FIG. 1.

Referring to FIG. 2, second portion 20 of body 11 is substantially hollow, thereby creating a hollow chamber 24 which is normally filled with air at atmospheric pressure. According to several aspects, one or multiple internal body ribs 26 outwardly, radially, and integrally extend from an internal face 27 of first portion 16, directed toward chamber 24. Body ribs 26 are provided to reduce the material, weight, and cost of first portion 16 of trunk cushion 10, when used.

Referring to FIG. 3 and again to FIG. 1, the connector 12 is bulbous shaped, having a radius end 28 extending outwardly via a conical shaped portion 30 to an engagement end 32, which is a maximum diameter portion of connector 12. A reduced diameter neck region 34 is smaller in diameter than the diameter of engagement end 32 and substantially fills an aperture 35 created in body panel 14 after the engagement end 32 is elastically compressed to pass through aperture 35 and then returns to the shape shown. Engagement end 32 has a planar end face 33 which is parallel to and contacts body panel 14 to thereafter resist removal of connector 12 of trunk cushion 10 from aperture 35. A planar shoulder end 36 of a load contact end 38 of first portion 16 is oriented parallel to planar end face 33 and abuts a face of body panel 14 on an opposite side of body panel 14 with respect to connector 12.

Figure 4:
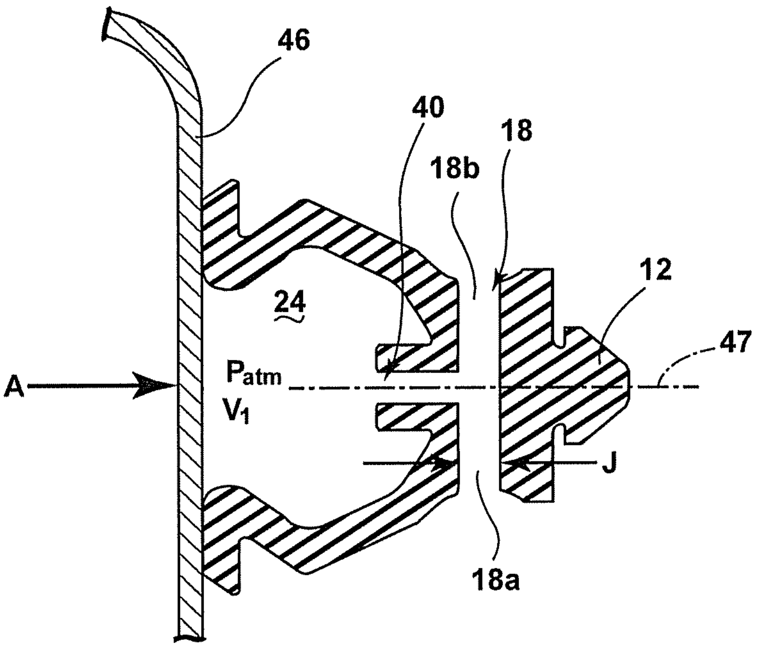
FIG. 4 is a cross sectional side elevational view taken at section 4 of FIG. 2.

A slot or bore 40 extends partially into the otherwise solid material of first portion 16 and communicates with both chamber 24 and through-aperture 18, which will be shown in greater detail in reference to FIG. 4. A maximum diameter portion 42 of second body second portion 20 having second diameter "B" extends outwardly with respect to a minimum diameter portion 44 of third portion 21 having diameter "C". This geometry allows body 11 to longitudinally compress in a first direction "E" due to the application of force "D", which also outwardly extends both maximum diameter portion 42 and second portion 20 in an outward direction "F" when force "D" is received at flange 22 from a trunk lid arm 48 (shown and described in reference to FIGS. 5-6). After absorbing the energy of the travel force (force "D") from the trunk lid arm, maximum diameter portion 42 and second portion 20 elastically return in a direction "G" to the original non-deflected condition shown, and flange 22 moves in a return direction "H" to the original non-deflected condition shown. The hollow chamber 24 will at least partially compress during deflection of body 11. The substantially solid cross section of first portion 16 material can compress when the trunk lid arm contacts body 11, but is intended to remain substantially in an un-deflected state to prevent body expansion/contraction at the engagement location of first portion 16 with the body panel 14.

Body 11 is designed to absorb energy from contact by the trunk lid arm using several different features. The third portion of body 11 includes a body wall 45 provided in multiple sections each having a different thickness. During initial contact with flange 22, a first section 45*a* having a minimum thickness $T_1$ located proximate to flange 22 initially deflects and absorbs a first portion of the contact energy. As displacement of body 11 continues, a second section 45*b* having an intermediate thickness $T_2$ extending toward first portion 16 subsequently deflects and absorbs a second larger portion of the contact energy. Intermediate thickness $T_2$ is greater than minimum thickness $T_1$. During a following stage of deflection, a third section 45*c* having an maximum thickness $T_3$ defining the transition of body wall 45 into first portion 16 subsequently deflects and absorbs a third and largest portion of the contact energy. Third section 45*c* thickness $T_3$ is greater than both intermediate thickness $T_2$ and minimum thickness $T_1$. A rate of energy absorption (e.g., newtons per second) of trunk cushion 10 provided by increasing the thickness of body wall 45 from first section 45*a* to second section 45*b* and finally to third section 45*c* therefore can also be "tuned" by initial selection of the thicknesses $T_1$, $T_2$, and $T_3$.

Figure 3:
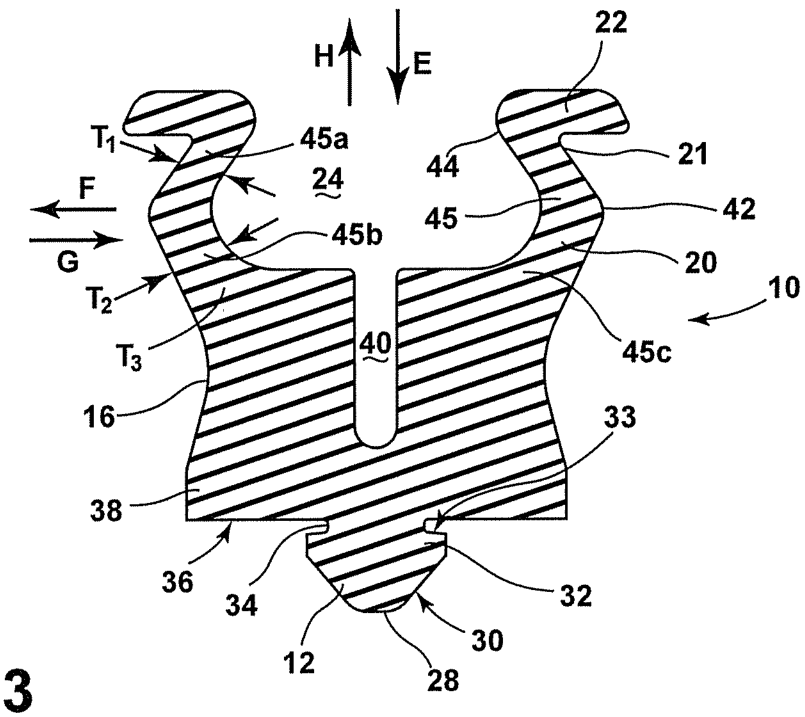
FIG. 3 is a cross sectional front elevational view taken at section 3 of FIG. 2.

Referring to FIG. 4 and again to FIGS. 1 and 3, when a trunk lid arm panel 46 contacts flange 22 and body 11 partially compresses at hollow chamber 24, an initial or first volume $V_1$ of hollow chamber 24 is decreased to a smaller second volume $V_2$ (shown in FIG. 7), thereby increasing an air pressure in chamber 24 from atmospheric pressure $P_{atm}$ to a higher or increased pressure $P_{incr}$. The increased air pressure $P_{incr}$ is relieved by discharge of air from hollow chamber 24 through slot 40 and out through-aperture 18 to atmosphere. A diameter "J" of through-aperture 18 is predetermined to provide resistance to air flow discharging from hollow chamber 24, thereby controlling a rate of compression of body portion 20 and also an amount of force "D" per unit time (D/t) trunk cushion 10 absorbs. An air discharge rate of trunk cushion 10 can therefore be "tuned" by changing the diameter "J" of through-aperture 18 for different sizes/aspects of trunk cushion 10, for example by modifying the tooling used to create trunk cushion 10, such as an injection molding die, or by enlarging through-aperture 18 after the molding operation.

It is also noted that the orientation of through-aperture 18 is transverse to a longitudinal axis 47 of trunk cushion 10. This transverse orientation provides several advantages over known bumper designs. First, slot 40 is not continuous along longitudinal axis 47 and therefore does not extend through connector 12, which would structurally weaken connector 12. Second, the diameter of through-aperture 18 can be smaller, equal to, or larger than a diameter or cross sectional area of slot 40 because through-aperture 18 is divided into two discharge paths defined by first and second portions 18*a*, 18*b* of through-aperture 18 where slot 40 intersects through-aperture 18. The additional flow control provided by the ability to have different diameters for first and second portions 18*a*, 18*b* and further to provide different diameters between slot 40 and through-aperture 18 provides greater flexibility for tuning the air discharge rate compared to a single diameter path that would be available if slot 40 extended entirely through connector 12, which is common in known bumper designs.

It is further noted that although an EPDM material is one preferred material for trunk cushion 10, other resilient materials adapted for use in an injection molding process, including rubber or plastic composites, can be used. Also, although an exemplary use for absorbing the energy from a trunk lid during an opening operation is provided, trunk cushion 10 can be used in multiple similar energy absorbing/dissipation operations, including but not limited to vehicle door or hood opening/closing operations, as well as applications not limited to automobile vehicle uses.

Figure 5:
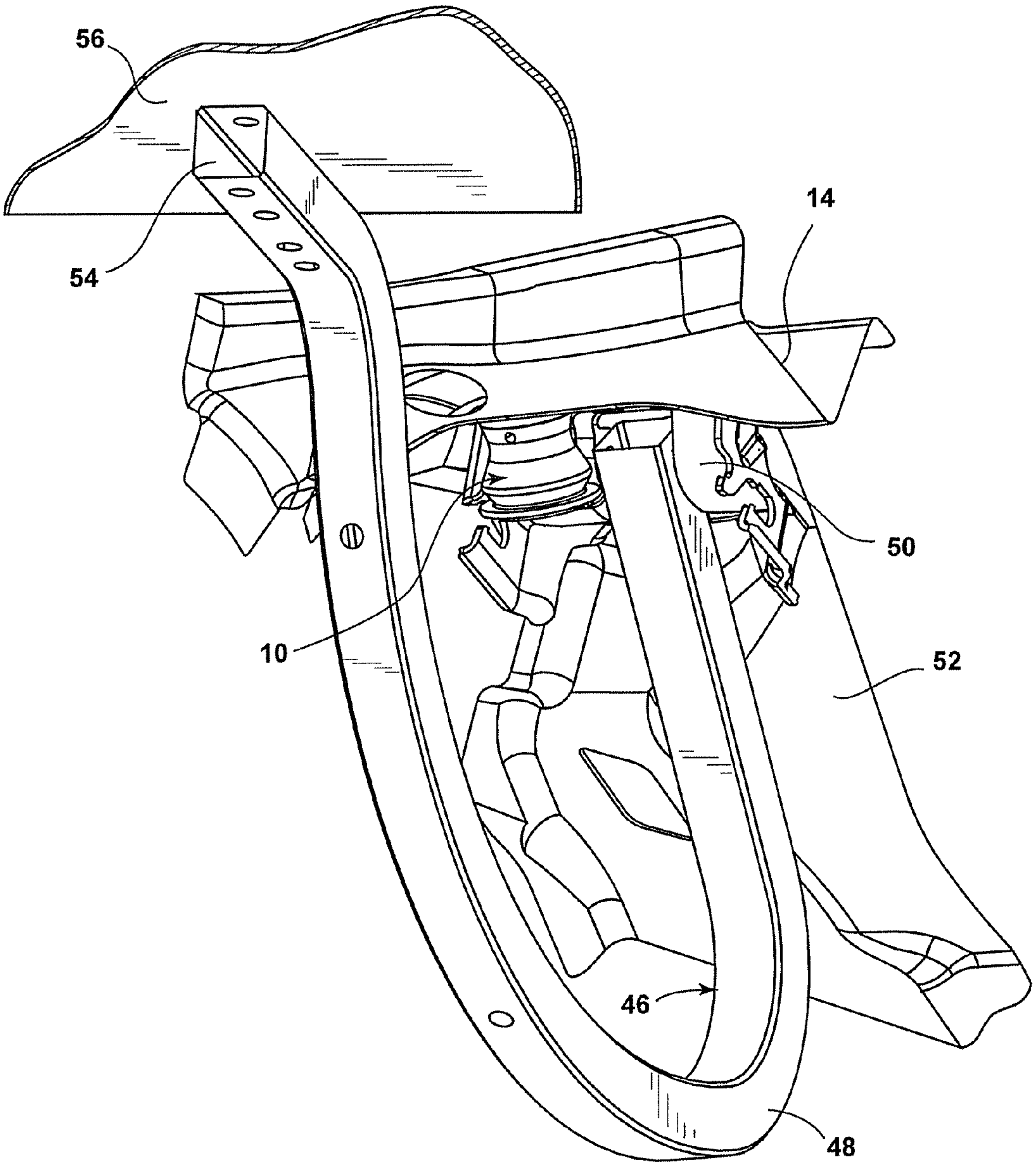
FIG. 5 is rear right perspective view of a trunk lid and trunk arm installation having a trunk cushion of the present disclosure in a non-compressed condition.

Referring to FIG. 5, a trunk lid arm panel 46 defines a portion of a trunk lid arm 48, which according to several aspects defines a rectangular tube connected at a first end to a trunk lid operating mechanism 50. Trunk lid operating mechanism 50 can be designed to determine an opening speed of trunk lid arm 48 and can be further designed to increase or minimize resistance to opening. The trunk lid arm 48 and trunk lid operating mechanism 50 are together contained within a trunk enclosure 52 (only partially shown) in a closed condition shown. An opposite or free end 54 of trunk lid arm 48 is connected to a trunk lid 56 (only partially shown for clarity). Trunk lid operating mechanism 50 also provides a biasing function of holding trunk lid 56 in the open position. The trunk cushion 10 of the present disclosure is connected to structure of the body panel 14 which forms a portion of trunk enclosure 52. It will be evident that more than one trunk lid arm 48 and therefore more than one trunk cushion 10 can be used in a single vehicle trunk arrangement.

Referring to FIG. 6 and again to FIGS. 5 and 3, trunk cushion 10 is aligned to be contacted by trunk lid arm 48 when trunk lid arm 48 is rotated with respect to trunk lid operating mechanism 50 to a trunk lid open position shown. At the open position, an arm portion 58 having trunk lid arm panel 46 of trunk of trunk lid arm 48 contacts and partially compresses second portion 20 of trunk cushion 10. A portion of the air inside of second portion 20 which is pressurized above atmospheric pressure by the compression of second portion 20 escapes via through-aperture 18 to atmosphere, thereby absorbing a portion of the energy of impact (force "D") from trunk lid arm 48 as the energy converted to increase the air pressure. Another portion of the energy of impact from force "D" is also absorbed/dissipated by deflection/compression of the different thickness portions of body wall 45, previously described, during compression of second portion 20.

Figure 6:
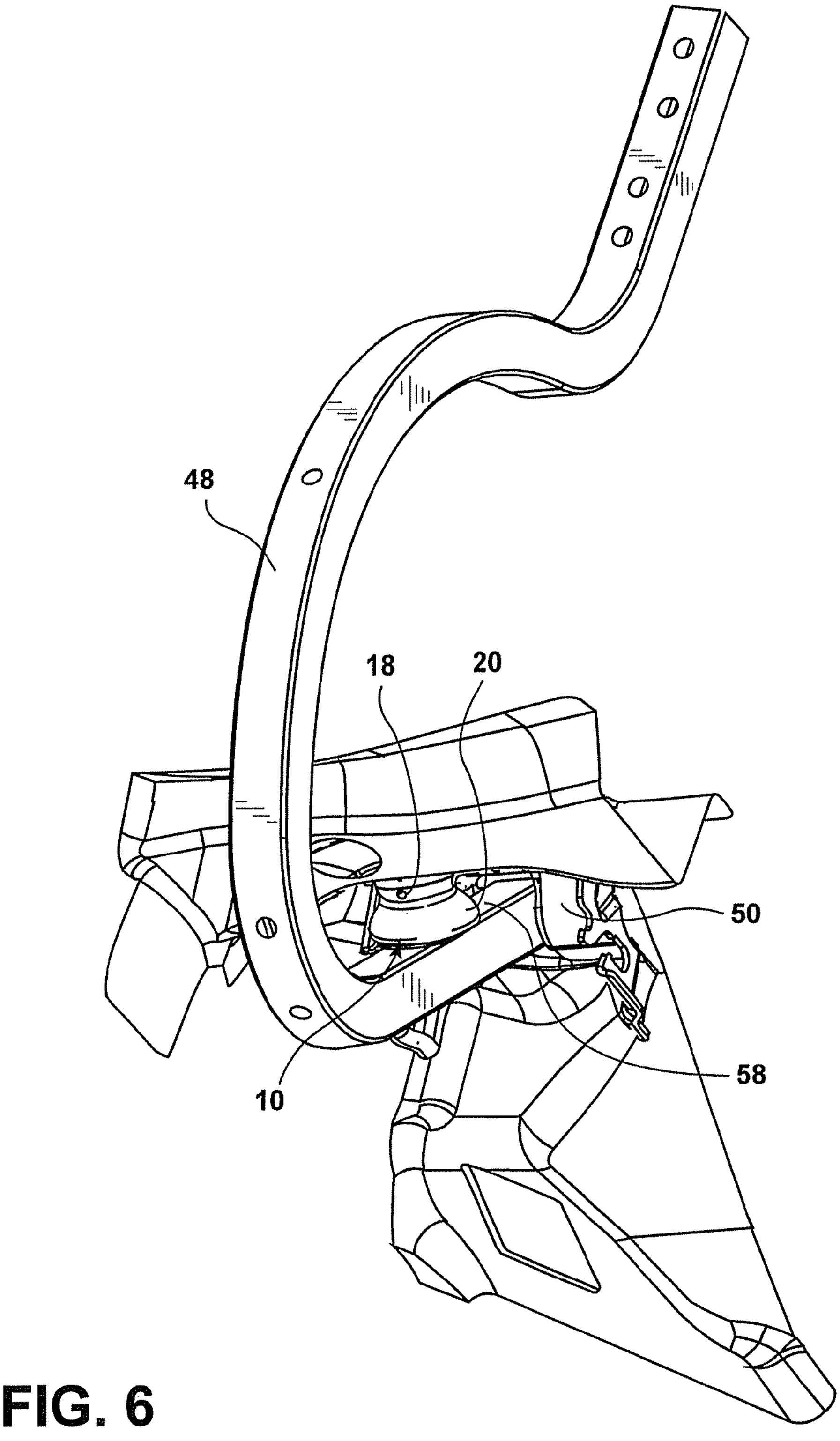
FIG. 6 is a rear right perspective view modified from FIG. 5 to show the trunk cushion during compression due to contact by the trunk arm.

Referring to FIG. 7 and again to FIGS. 3 and 5-6, trunk cushion 10 is positioned having flange 22 oriented substantially parallel with trunk lid arm 48 when trunk lid arm 48 reaches a nominal open position shown. When a force or opening velocity of the trunk lid arm 48 is converted to force "D" acting on trunk cushion 10 during opening of the trunk lid 56, second portion 20 and third portion 21 defining the hollow chamber 24 will compress to the smaller second volume $V_2$, temporarily increasing an air pressure $P_{incr}$ in hollow chamber 24 in the nominal open position. The trunk lid arm 48 may also be angularly oriented with respect to flange 22. This is represented by a strong open position (shown in phantom) of trunk lid arm 48'. In the strong open position, substantially all of hollow chamber 24 may be occupied by trunk lid arm 48', while first portion 16 remains substantially in its non-compressed condition.

A total air flow rate "K" of the air exiting hollow chamber 24 via the first and second portions 18*a*, 18*b* of through-aperture 18 is restricted or controlled by the diameter originally selected for slot 40 and diameter "J" of through-aperture 18. Flow frictional loss due to air exiting via through-aperture 18 thereby absorbs some of the energy of force "D" converted during compression of hollow chamber 24 which increased the air pressure to $P_{incr}$. The total flow indicated by flow rate "K" exiting hollow chamber 24 via slot 40 is divisible into first and second flow rates "M", "N" through the individual first and second portions 18*a*, 18*b*.

Figure 7:
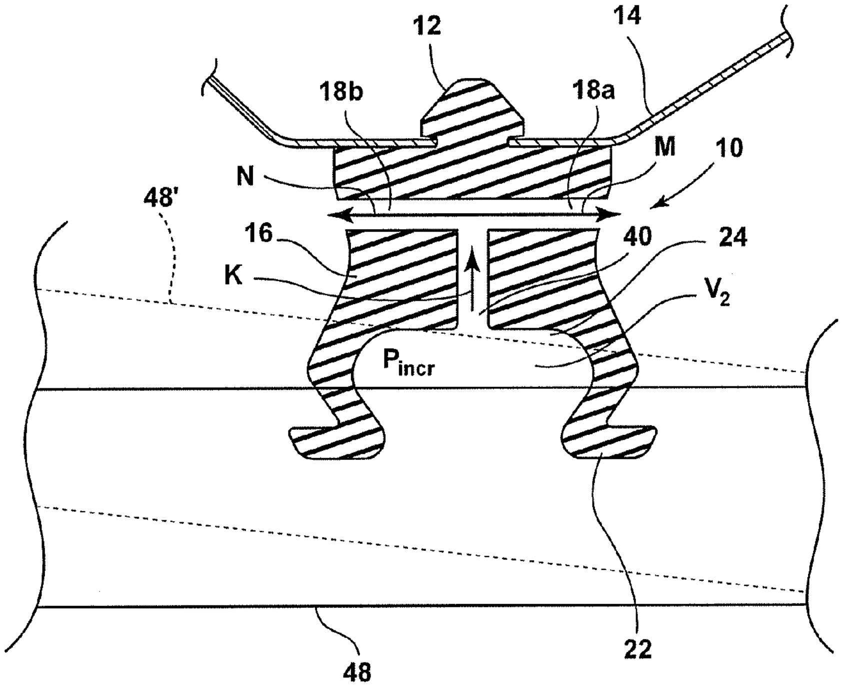
FIG. 7 is a cross sectional side elevational view similar to FIG. 4 showing nominal and strong open positions of the trunk arm.
Figure 8:
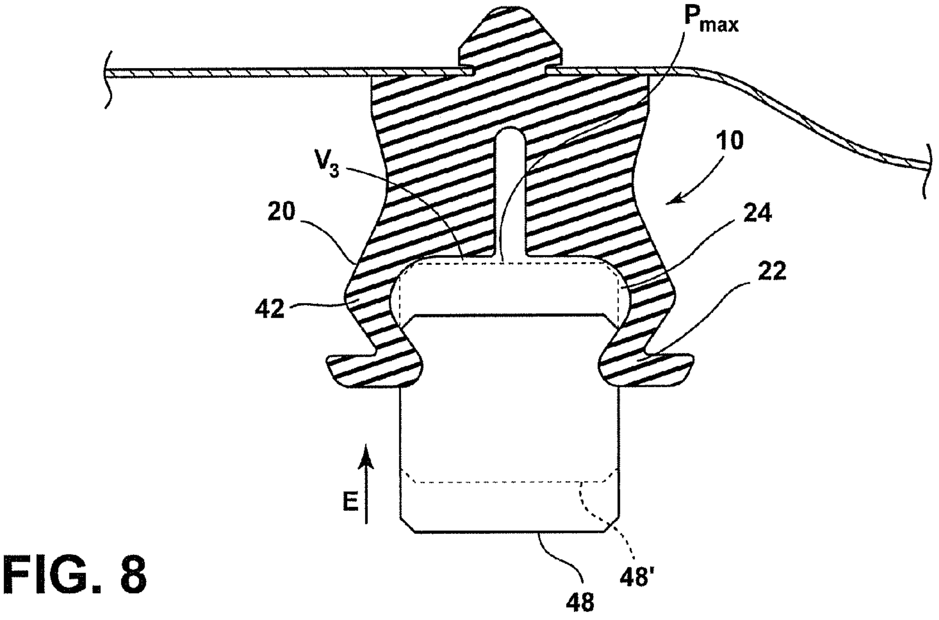
FIG. 8 is a cross sectional rear elevational view showing the nominal and strong open positions of the trunk arm.

Referring to FIG. 8 and again to FIGS. 4 and 7, trunk cushion 10 is shown in a position oriented 90 degrees with respect to FIG. 7 to indicate the various amounts of incursion of hollow chamber 24 that can occur between the nominal open and strong open positions. It is noted flange 22 will also displace in the first direction "E" from the nominal position shown during compression of second portion 20. When the greatest anticipated force "D" created for example by the greatest design opening velocity is used during opening of the trunk lid 56, second portion 20 will compress to a still smaller or minimum third volume $V_3$. The pressure in hollow chamber 24 temporarily increases to a maximum $P_{max}$ at this time. Because the diameter "J" of through-aperture 18 is unchanged while the air pressure increases to $P_{max}$, the velocity and flow-rate "K" of air escaping that is divisible into flow rates "M" and "N" through first and second portions 18*a*, 18*b* of through-aperture 18 is a maximum. Second portion 20 of body 11 is also compressed to a maximum amount. Therefore, due to the increased compression of body 11 and the resistance to air flow via through-aperture 18 also being at a maximum, the additional energy delivered by trunk lid arm 48 at the strong open position is absorbed/dissipated.

Trunk cushions of the present disclosure offer several advantages. Trunk cushion 10 provides a bell-shaped body having different thicknesses in successive portions of a body wall 45 that elastically compresses to absorb force "D". Trunk cushion 10 includes a flange to initially spread the area of body 11 absorbing force "D" and includes hollow chamber 24 that decreases in volume, creating an increase in internal pressure within the hollow chamber during body compression. A flow path including the bore 40 and through-aperture 18 creates a restricted flow rate of air to escape the hollow chamber as it is compressed. By changing a diameter of the through-aperture 18 which is oriented transverse to a longitudinal axis of trunk cushion 10, thereby creating two discharge portions of the through-aperture, a rate of energy absorption/dissipation can be tuned/modified for trunk cushions 10 having different sizes/geometries. A trunk cushion 10 having a hollow chamber portion at an energy receiving end and a substantially solid portion at a body panel connecting end allow the hollow chamber to compress while the solid portion substantially minimizes body expansion or contraction at its engagement location with the body panel, thereby retaining the geometry of the flow path provided by the through-aperture.

An injection molded material trunk cushion 10 replaces known rubber stops used for the purpose of absorbing trunk lid opening force and is inserted into an aperture of a vehicle body panel proximate to the trunk lid connecting arm. Trunk cushion 10 absorbs the energy of the trunk lid connecting arm when the trunk lid reaches its fully open position. The trunk cushion 10 partially compresses to absorb the impact energy and includes air passages to allow air present in the trunk cushion body to bleed out at a known or controlled rate to further dampen the impact load. The trunk cushion then elastically returns to its nominal or preloaded shape after the trunk lid opening event while the trunk lid stays at and does not rebound away from the fully open position.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cushion member, comprising:

a resilient material body having multiple different diameters defining a bell-shape, the body including:
- a substantially solid first portion having a first diameter, the first portion being coaxially aligned with a body longitudinal axis;
- a through-aperture extending through the first portion and oriented perpendicular to the body longitudinal axis;
- a substantially hollow second portion defining a hollow chamber in communication with the through-aperture, the second portion having a second diameter which is larger than the first diameter of the first portion;
- a flange oppositely positioned with respect to the first portion, the differing first and second diameters of the body inducing the body to longitudinally compress when a force is applied to the flange and to return to an uncompressed state after the force is dissipated; and
- a slot extending partially into the solid first portion and communicating with both the hollow chamber and the through-aperture permitting air in the hollow chamber to escape through the through-aperture to the atmosphere during compression of the second portion, the through-aperture divided into two discharge paths defined by first and second portions of the through-aperture where the slot intersects the through-aperture, the through-aperture portions each having a different diameter such that an overall flow rate of air through the slot is divisible into oppositely directed ones of the first and second through-aperture portions defining first and second flow rates.

2. The cushion member of claim 1, further including a third portion positioned between the second portion and the flange, the third portion having a third diameter smaller than the second diameter.

3. The cushion member of claim 2, wherein the second and third portions define a body wall, the body wall divisible into three sections, including:

a first section having a minimum thickness located proximate to flange;

a second section connected to the first section and having an intermediate thickness which is greater than the minimum thickness; and a third section having a maximum thickness greater than both the intermediate thickness and the minimum thickness, the third section defining a transition of the body wall into the first portion.

4. The cushion member of claim 1, wherein a first diameter of the slot and a second diameter of the through-aperture are predetermined and are selected to modify a resistance to air flow when the air flows out of the hollow chamber via the slot and through the through-aperture.

5. The cushion member of claim 1, wherein the cushion member is made from a resilient EPDM (ethylene propylene diene monomer) material.

6. The cushion member of claim 1, wherein the cushion member has a predetermined Shore A durometer that ranges from between approximately 25 to 80.

7. The cushion member of claim 1, further including:

an end flange connected to the third portion; and a connector integrally connected to and extending from a first end of the body opposite to the flange, the connector adapted to be compressed when received in an aperture of a vehicle body panel and expanding to thereafter resist removal of the body from the vehicle body panel.

8. A cushion member, comprising:

a resilient material body having multiple different diameters defining a body bell-shape, the body including:

a substantially solid first portion having a first diameter;

a through-aperture extending through the first portion transverse to a longitudinal axis of the body the through-aperture divided into two discharge paths defined by first and second portions of the through-aperture each having a different diameter;

a slot extending partially into the solid first portion and communicating with both the hollow chamber and the through-aperture, the slot connecting to the through-aperture;

a hollow second portion defining a hollow chamber in communication with the through-aperture, the second portion having a second diameter which is larger than the first diameter of the first portion;

a third portion having a third diameter smaller than the second diameter; and an end flange connected to the third portion, the differing first, second, and third diameters of the body inducing the body to elastically compress when a force is applied to the end flange and to return to an uncompressed state after the force is dissipated, a flow rate of air from the hollow chamber forced out of the hollow chamber during compression of the second and third portions and out the through-aperture being restricted by each diameter of the first and second portions of the through-aperture.

9. The cushion member of claim 8, wherein a total air flow rate of the air exiting the hollow chamber via the first and second through-aperture portions is controlled by a diameter selected for the slot and the diameter of the first and second portions of the through-aperture, the slot and the through-aperture absorbing a portion of the force converted during compression of the body acting to increase an air pressure in the hollow chamber.

10. The cushion member of claim 9, wherein the total air flow rate exiting the hollow chamber via the slot is divisible into first and second flow rates through the individual first and second through-aperture portions.

11. The cushion member of claim 8, wherein the second and third portions define a body wall, the body wall divisible into a first section located proximate to flange having a first thickness, a second section connected to the first section and having an intermediate thickness which is greater than the first thickness, and a third section having a maximum thickness greater than both the intermediate thickness and the first thickness.

12. The cushion member of claim 11, wherein a rate of energy absorption of the trunk cushion provided by successively increasing the thickness of the body wall from the first section to the second section and to the third section is tuned by changing any one or all of the thicknesses.

13. The cushion member of claim 11, wherein the third section defines a transition of the body wall into the first portion.

* * * * *